(12) United States Patent
Song

(10) Patent No.: US 9,551,892 B2
(45) Date of Patent: Jan. 24, 2017

(54) DISPLAY DEVICE

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventor: Yong Song, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 14/743,848

(22) Filed: Jun. 18, 2015

(65) Prior Publication Data
US 2016/0238873 A1 Aug. 18, 2016

(30) Foreign Application Priority Data
Feb. 12, 2015 (CN) .......................... 2015 1 0076376

(51) Int. Cl.
*G02F 1/1333* (2006.01)
*G02F 1/1339* (2006.01)

(52) U.S. Cl.
CPC ....... *G02F 1/133308* (2013.01); *G02F 1/1339* (2013.01); *G02F 1/13338* (2013.01); *G02F 2001/133317* (2013.01); *G02F 2201/50* (2013.01)

(58) Field of Classification Search
CPC .............. G02F 1/133308; G02F 1/1339; G02F 2201/50; G02F 2001/133317; G02F 1/13338

USPC ................................................ 349/58, 60–62
See application file for complete search history.

(56) References Cited

U.S. PATENT DOCUMENTS

| 6,295,105 | B1* | 9/2001 | Lee .................... | G02F 1/133615 349/65 |
|---|---|---|---|---|
| 2005/0280751 | A1* | 12/2005 | Kim .................. | G02F 1/133308 349/58 |
| 2006/0176417 | A1* | 8/2006 | Wu ...................... | G02F 1/13452 349/58 |
| 2007/0132909 | A1* | 6/2007 | Oohira .............. | G02F 1/133308 349/58 |

(Continued)

FOREIGN PATENT DOCUMENTS

CN   202884679   * 4/2013

*Primary Examiner* — Hoan C Nguyen
(74) *Attorney, Agent, or Firm* — Blakely Sokoloff Taylor & Zafman LLP

(57) ABSTRACT

The invention refers to a technical problem of display device, and discloses a display device. The display device includes a backlight source, a rubber frame provided on the backlight source, a LGP and an optical film layer provided in the rubber frame, and shading bars lapping over the rubber frame and the optical film layer respectively, and further includes a display panel, which contains a display panel border lapping over the rubber frame. In the above technical solution, the rubber frame is used for a supporter to support the display panel. Specifically, the display panel border exposed from the display panel laps over the rubber frame, so that the rubber frame is able to support the border as a supporter when the display panel is pressed.

7 Claims, 2 Drawing Sheets

(56) References Cited

U.S. PATENT DOCUMENTS

2012/0086890 A1\* 4/2012 Shimokawa ...... G02F 1/133308
　　　　　　　　　　　　　　　　　　　349/65

\* cited by examiner

- - Prior Art - -   Fig. 1

DISPLAY DEVICE

TECHNICAL FIELD

The invention refers to a display technical field, and more specifically to a display device.

BACKGROUND

With continuous innovation to mobile phone product, touch technique has been widely used. The user will often touch the screen during using the mobile phone, thus there would be a water ripple phenomenon on the screen if the screen is not good. Currently, the most common defects are of two types: middle water ripple and peripheral water ripple.

Therein, the formation reason of the peripheral water ripple is: the display panel is subject to external force during being pressed, resulting in the cell gap of the display panel changing, so that water ripple occurs. Therein, the display panel would be subject to extrusion from the external force and the shading bar 6, therefore the above issue occurs. As shown in FIG. 1, FIG. 1 shows a display device in prior art, which includes a rubber frame 5 shown in the figure, a LGP 4 and a optical film layer 3 provided in the rubber frame 5, shading bars 6 lapping over the rubber frame 5 and the optical film layer 3 respectively, and a display panel provided on the optical film layer 3. The display panel includes two substrates 1 aligned, a liquid crystal layer 2 provided between the two substrates 1, a sealant 7 sealing the two substrates 1 and a display panel border 8 packing the sealant 7. As shown in FIG. 1, there is a gap between the border 8 and the rubber frame 5, so that when the display panel is subject to an external force, the display panel would be subject to extrusions from both the external force and the shading bar 6, leading to the water ripple phenomenon.

SUMMARY

The invention provides a display device, for mitigating the water ripple phenomenon on the display panel when being pressed, and improving the display effect of the display device when being pressed.

The invention provides a display device, which includes a backlight source, a rubber frame provided on the backlight source, a LGP and an optical film layer provided in the rubber frame, and shading bars lapping over the rubber frame and the optical film layer respectively, and further includes:

a display panel, which contains two aligned substrates, a liquid crystal layer provided in the aligned substrates, a sealant sealing the two aligned substrates and a display panel border packing outside of the sealant, and the display panel border laps over the rubber frame.

In the above technical solution, the display panel is supported by the rubber frame which acting as a supporter. Specifically, the display panel border exposed from the display panel laps over the rubber frame, so that there is no gap between the rubber frame and the border, which makes the rubber frame be able to support the border as a supporter when the display panel is pressed. At this time, a reacting force provided by the rubber frame is transmitted through the display panel border to the substrate of the display panel which is far away from the optical film layer, so as to counteract the force exerted on the liquid crystal layer in the display panel by the external force, thus reducing the water ripple phenomenon due to the liquid crystal layer is extruded, and improving the display effect of the display panel when being pressed.

Preferably, the substrate of the display panel which is close to the optical film layer is within the rubber frame. This facilitates the display panel border lapping over the rubber frame.

Preferably, the inner wall of the frame body of the rubber frame is provided with a fillet. This facilitates the disposing of the shading bars.

Preferably, the radius of the fillet is larger than the width of the portion of the sealant which extends into the rubber frame, and smaller than the thickness of the rubber frame. This ensures lapping of the display panel, and facilitates disposing of the shading bar. Preferably, the sum of the radius of the fillet and the gap between the optical film layer and the rubber frame is smaller than the distance of the outer edge of the display panel border from the substrate.

Preferably, the shading bar is a curved bar having an S-like shape.

Preferably, the thickness of the rubber frame is not less than the total thickness of the substrate of the display panel which is close to the optical film layer, the optical film layer and the LGP. This reduces the force exerted on the liquid crystal layer as much as possible.

Optionally, the thickness of the rubber frame is equal to the total thickness of the substrate of the display panel which is close to the optical film layer, the optical film layer and the LGP.

Optionally, there is a gap between the shading bar and the substrate of the display panel which is close to the optical film layer.

LIST OF REFERENCE NUMBERS

1: substrate; 2: liquid crystal layer; 3: optical film layer; 4: LGP (light guiding plate); 5: rubber frame; 6: shading bar;
7: sealant; 8: display panel border; 10: substrate;
20: liquid crystal layer; 30: optical film layer; 40: LGP
50: rubber frame; 60: shading bar; 70: sealant;
80: display panel border.

Detail Embodiments

In order to mitigate the water ripple effect of the display device when being pressed, an embodiment of the invention provides a display device. In the technical solution of this invention, the display panel border of the display panel laps over the rubber frame, so as to make the rubber frame act as a supporter, which mitigates the water ripple phenomenon in the display panel when being pressed. For facilitating understanding of the embodiment, the embodiment will be described in detail by specific implementation.

Figure 1:
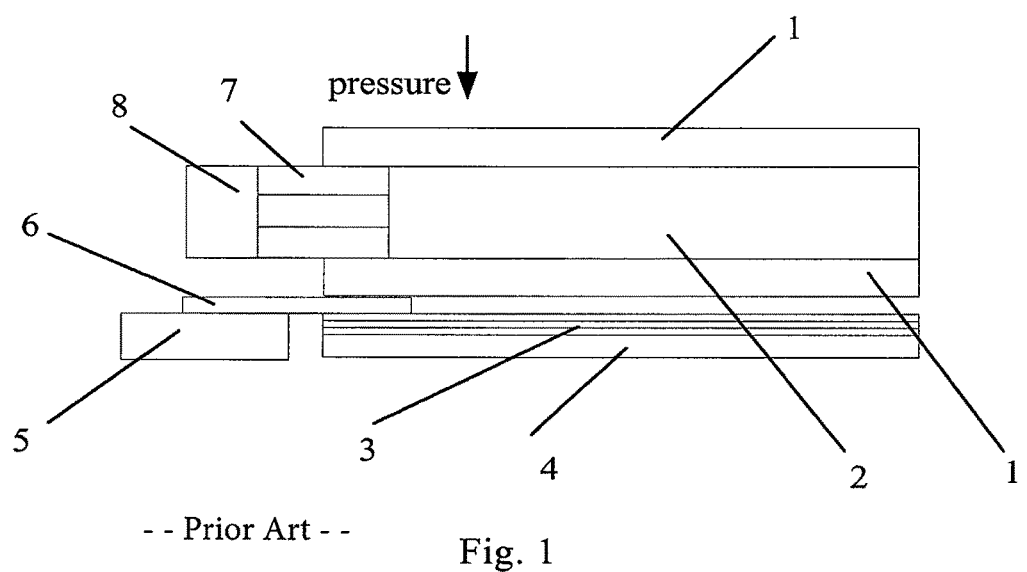
FIG. 1 is a structure schematic diagram of the display panel of the display device in prior art.
Figure 2:
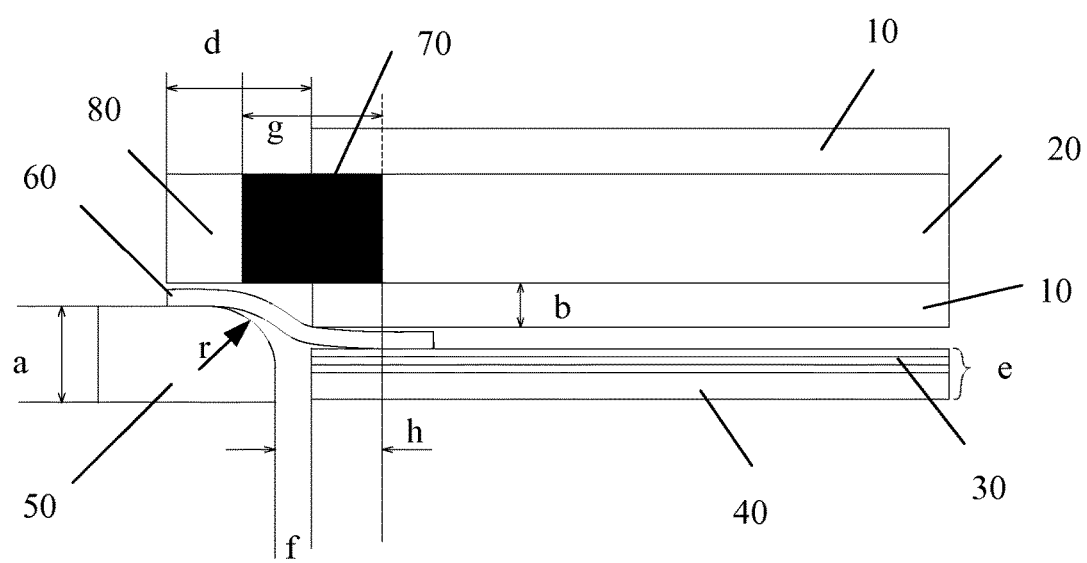
FIG. 2 is a structure schematic diagram of the display device provided by an embodiment of the invention.

As shown in FIG. 2, FIG. 2 shows a structure schematic diagram of the display device provided by the embodiment of the invention.

The embodiment of the invention provides a display device, which includes a backlight source, a rubber frame 50 provided on the backlight source, a LGP 40 and an optical film layer 30 provided in the rubber frame 50, and shading bars 60 lapping over the rubber frame 50 and the optical film layer 30 respectively, and further includes:

a display panel, which contains two aligned substrates 10, a liquid crystal layer 20 provided in the aligned substrates 10, a sealant 70 sealing the two aligned substrates 10 and a display panel border 80 packing outside of the sealant 70, and the display panel border 80 laps over the rubber frame 50.

In the above embodiment, the rubber frame 50 is used for supporting the display panel as a supporter. Specifically, the display panel border 80 exposed from the display panel laps over the rubber frame 50, so that the rubber frame 50 supports the border as a supporter when the display panel is pressed. At this time, a reacting force provided by the rubber frame 50 is transmitted through the display panel border 80 to the substrate 10 of the display panel which is far away from the optical film layer, so as to counteract the force exerted by the external force on the liquid crystal layer 20 in the display panel, thus reducing the water ripple phenomenon due to the liquid crystal layer 20 is extruded, and improving the display effect of the display panel when being pressed.

For facilitating understanding of the embodiment of the invention, the structure thereof will be described in detail below in connection with FIG. 2.

As shown in FIG. 2, FIG. 2 shows a structure schematic diagram of the display device provided by the embodiment of the invention. Therein, sign a is the thickness of the rubber frame 50, b is the thickness of the substrate 10 of the display panel which is close to the optical film layer 30, c is the thickness of the shading bar 60, and d is the distance of the outer edge of the display panel border 80 from the substrate 10. r is the radius of the fillet on the inside of the rubber frame 50, e is the sum of the thicknesses of the optical film layer and the LGP 40, f is the gap between the optical film layer and the rubber frame 50, g is the width of the sealant 70, and h is the distance of the rubber frame 50 from the inside of the sealant 70.

Upon assembling the display device, as shown in FIG. 2, the thickness of the rubber frame 50 is larger than the sum of the thicknesses of the optical film layer 30 and the LGP 40, and the substrate 10 of the display panel which is close to the optical film layer 30 is within the rubber frame 50, that is, the substrate 10 does not reach the rubber frame 50 in the horizontal direction, so that does not contact the rubber frame 50. Specifically, as shown in FIG. 2, the thickness of the rubber frame 50 is not less than the total thickness of the substrate 10 of the display panel which is close to the optical film layer 30, the optical film layer 30 and the LGP 40, that is $a >= b+e$. Therefore, while disposing, as shown in FIG. 2, the substrate 10 of the display panel which is close to the optical film layer 30 is within the rubber frame 50, and the display panel border 80 laps over the rubber frame 50. When the shading bar 60 laps over the rubber frame 50, the display panel border 80 laps over the position at which the shading bar 60 laps over the rubber frame 50, so that the rubber frame 50 supports the display panel via the lapping display panel border 80. After the whole display panel is assembled, the rubber frame 50 acts as a supporter, thus reducing the force exerted on the substrate 10 in the display panel. Specifically, during specific producing, it can be chosen that, there is a gap between the shading bar 60 and the substrate 10 of the display panel which is close to the optical film layer 30, or there is not a gap between the shading bar 60 and the substrate 10 of the display panel which is close to the optical film layer 30, that is the thickness of the rubber frame 50 is equal to the total thickness of the substrate 10 of the display panel which is close to the optical film layer 30, the optical film layer 30 and the LGP 40, i.e. $a=b+e$.

In other words, in the embodiment of the invention, increasing the thickness of the rubber frame 50, so that after the display panel is assembled, the rubber frame 50 can contact the display panel border 80 directly or indirectly (via the shading bar 60), so as to form a main supporter for the display panel.

When an external force is exerted on the display panel, the external force is transmitted through the substrate 10 which is far away from the optical film layer 30 to the display panel border 80, and through the display panel border 80 to the rubber frame 50. Since the rubber frame 50 provides some inverse support force, the affect of the external force on the liquid crystal layer 20 is reduced when the latter is subject to the external force, and the stress condition of the whole display panel is improved, thus mitigating the water ripple phenomenon of the display panel when being pressed, and improving the display effect of the display device when being pressed. After the display device provided by the embodiment is tested, it can be found that, the level of anti-water ripple increases from 1.5N (newton, the unit of force) to 5N. That is to say, the water ripple phenomenon would not occur in the display panel of the invention until a external force of 5N is applied thereon, while in the display panel of prior art, the water ripple phenomenon would occur when a external force of 1.5N is applied thereon. This means the display panel of the invention has significant advantage.

Besides, for facilitate disposing of the shading bar 60, it can be seen from FIG. 2, the rubber frame 50 provided by the embodiment is provided with a fillet, which improves the curve condition of the disposed shading bar 60. Specifically, the shading bar 60 is a curve bar having a S-like shape. Therefore, the shading bar 60 can be disposed more easily, reducing the difficulty of producing the display device. However it is to be understood that, the fillet provided should not affect the support effect of the rubber frame 50 on the display panel, therefore the radius of the fillet is limited. Specifically, the radius of the fillet is larger than the width of the portion of the sealant 70 which extends into the rubber frame 50, and smaller than the thickness of the rubber frame 50, that is: $r>g-h$; $r<a$. Preferably, the sum of the radius of the fillet and the gap between the optical film layer and the rubber frame 50 is smaller than the distance of the outer edge of the display panel border 80 from the substrate 10, that is: $r+f<d$. As can be seen from FIG. 2, the above conditions make the display panel border be able to lap over the rubber frame properly.

Obviously, the skilled in the art can make various amendments and variations to the invention without departing from the sprite and scope of the invention, upon reading and understanding the disclosure of the invention. As such, in case the amendments and variations to the invention belong to the scope of the claims and their equivalents of this invention, the invention is intended to include these amendments and variations. In the claims, wording "include" does not exclude other elements or steps, and the indefinite article "a" or "an" does not exclude a plurality. The mere fact that certain measures are recited in mutually different dependent claims does not indicate that a combination of these measures cannot be used to advantage.

The invention claimed is:

1. A display device, therein the display device includes a backlight source, a rubber frame provided on the backlight source, a Light Guide Plate and an optical film layer provided in the rubber frame, and shading bars lapping over the rubber frame and the optical film layer respectively, and further includes:

a display panel, which contains two aligned substrates, a liquid crystal layer provided in the aligned substrates, a sealant sealing the two aligned substrates and a display panel border packing outside of the sealant, and the display panel border laps over the rubber frame;

the inner wall of the rubber frame is provided with a fillet;

the radius of the fillet is larger than the width of the portion of the sealant which extends into the rubber frame, and smaller than the thickness of the rubber frame.

2. The display device of claim 1, therein the substrate of the display panel which is close to the optical film layer is within the rubber frame.

3. The display device of claim 1, therein the sum of the radius of the fillet and the gap between the optical film layer and the rubber frame is smaller than the distance of the outer edge of the display panel border from the substrate.

4. The display device of claim 1, therein the shading bar is a curved bar having an S-like shape.

5. The display device of claim 1, therein the thickness of the rubber frame is not less than the total thickness of the substrate of the display panel which is close to the optical film layer, the optical film layer and the Light Guide Plate.

6. The display device of claim 5, therein the thickness of the rubber frame is equal to the total thickness of the substrate of the display panel which is close to the optical film layer, the optical film layer and the Light Guide Plate.

7. The display device of claim 5, therein there is a gap between the shading bar and the substrate of the display panel which is close to the optical film layer.

* * * * *